United States Patent Office 3,205,072
Patented Sept. 7, 1965

3,205,072
SENSITIVE COMPOSITIONS
Meyer S. Agruss, Chicago, Ill., assignor to Miehle-Goss-Dexter, Incorporated, Chicago, Ill., a corporation of Delaware
No Drawing. Filed July 13, 1960, Ser. No. 42,481
16 Claims. (Cl. 96—90)

This invention relates to the art of printing and is particularly concerned with the preparation of new and useful photosensitive compositions which may be coated on paper or other suitable surfaces, in the form of essentially colorless or relatively lightly colored bodies, and which are rendered colored or deeply colored, by exposure, through a desired transparency or the like, to electromagnetic radiation lower than 4000 angstrom units, particularly ultraviolet light or other such activating rays, for instance, X-rays.

It has long been known that solutions of aminotriarylacetonitriles or, in other words, leucocyanides of triphenylmethane dyes, generally in the form of solutions thereof, may be coated on paper or other materials in conjunction with an activator and exposed to ultraviolet light or shorter wave lengths, through a transparency, whereupon said aminotriarylacetonitriles are converted into colored bodies or dyes. Suitable activators known for such purpose are, for instance, alcohols, phenols, carboxylic acids such as tartaric acid, citric acid and benzoic acid, as well as other carboxylic acids and esters thereof, certain nitriles, certain aromatic amines, veratrole, resorcinol dimethyl ether, ethylene glycol ethers, phosphoric acid esters of monohydroxy compounds, aromatic carbinols, and numbers of other compounds. These approaches, and others, are disclosed in various patents among which may be mentioned U.S. Patents Nos. 2,441,561; 2,528,496; 2,676,887; 2,829,052; and 2,844,465. Thus, as disclosed in said patents, if an organic solvent solution, for example, a toluene solution, of a leucocyanide of a triphenylmethane dye, for instance, pararosaniline leucocyanide, malachite green leucocyanide, tetrachloro malachite green leucocyanide, crystal violet leucocyanide, and various other leucocyanides of triphenylmethane dyes such as are shown in the aforementioned patents, is coated onto paper, such solution is not affected by ultraviolet light. However, when an activator, for example, a higher molecular weight alcohol or higher molecular weight amine, or other activators, such as the activators disclosed in the aforementioned patents, is present, the leucocyanides of the triphenylmethane dyes become extremely sensitive to ultraviolet light and the leucocyanide compounds are changed quite quickly to their colored dye compounds.

In practical use, the compositions of the prior art, such as those which have been discussed above, have numbers of serious objections. For instance, when paper is coated with a solution of a leucocyanide of a triphenylmethane dye together with activators of the type described above, and said coated papers are exposed to ultraviolet light through a transparency, the colored dye images which result tend to fade out and become substantially colorless in a relatively short period of time, sometimes of the order of 24 hours, and this not infrequently occurs in the dark as well as under ambient light conditions. By "ambient" light conditions is meant normal indoor lighting or daylight. Attempts have been made to meet this problem, generally, for example, by the addition of acids, particularly non-volatile organic acids such as stearic acid, and, in certain special instances, by the selection of specific types of leucocyanides. Although the addition of such carboxylic acids as stearic acid tends to prevent the disappearance of the image while stored in the dark, under ambient light storage conditions the background of the image continues to get darker with the passage of time.

Other difficulties have also been encountered in connection with attempting to evolve commercially practicable compositions. Such difficulties have centered around such matters as inadequate maintenance of the sharpness of reproductions, adverse effects resulting from reactions of the leucocyanide or the dye with sizes inherently present in the papers which are coated with the leucocyanide compositions, and the fact that the activation of the dye in the presence of ultraviolet or other actinic light requires a much longer period of time through an ordinary film negative than when no transparency is used. In my copending application Serial No. 4,875, filed January 27, 1960, now U.S. Patent No. 3,131,062, effective solutions to such problems are disclosed.

The present invention is based upon a number of discoveries which have been related to each other so as to result in new and useful knowledge in the art dealing with photosensitive dye compounds for use in the arts dealing with photoduplication, microfilm enlargements, and the like.

It has been found, in the first place, that naphthyl methane dye leucocyanides and particularly diphenylnaphthyl methane dye leucocyanides and phenyl dinaphthyl methane dye leucocyanides are, in the presence of certain activators, sensitive to ultraviolet light or other electromagnetic radiation in the range of rays having a wave length lower than 4000 angstrom units. The properties and characteristics of the naphthyl methane dye leucocyanides are, however, distinctly different from those of the triphenylmethane dye leucocyanides. Thus, as indicated above, the latter are highly sensitive to ultraviolet light in the presence of organic carboxylic acids, or strong inorganic acids, or materials containing alcoholic or phenolic hydroxyl groups, each of said classes of substances functioning as activators for said triphenylmethane dye leucocyanides. By way of sharp contrast, the naphthyl methane dye leucocyanides, exemplified particularly by the diphenyl-naphthyl methane dye leucocyanides, are insensitive to ultraviolet light in the presence of organic carboxylic acids, or strong inorganic acids, or materials containing alcoholic or phenolic hydroxyl groups or, worded otherwise, such classes of substances do not function as activators for the aforesaid naphthyl methane dye leucocyanides.

It has been discovered, however, pursuant to the present invention, that the aforesaid naphthyl methane dye leucocyanides, in the presence of ultraviolet light or other electromagnetic radiation having wave lengths less than 4000 angstrom units, are sensitive or are activated in the presence together of non-oxidizing strong inorganic acids and materials containing an alcoholic (or phenolic) hydroxyl group or groups. Moreover, once at least certain of the dyes, for instance, blue dyes, are formed in the presence of ultraviolet light or similar electromagnetic radiations from the said naphthyl methane dye leucocyanides, the resulting color does not fade or disappear in the presence of strong aqueous ammonium hydroxide. Here, again, is a sharp differentiation from the situation in regard to various of the triphenylmethane dyes, notably the blue colored dyes, which, when formed from the leucocyanides in the presence of the heretofore known activators, almost immediately disappear in the presence of strong aqueous ammonium hydroxide.

The naphthyl methane dye leucocyanides which are utilized in accordance with the present invention can be selected, for instance, from those which are known to the art and disclosed in numerous patents and publications. Typical or illustrative examples of said naphthyl methane dyes, which comprise diphenyl-naphthyl methane dyes, phenyl-dinaphthyl methane dyes, and trinaphthyl methane dyes, are set forth in the following Table 1, it being understood that the same are utilized in the form of their leucocyanides. Of especial utility are the leucocyanides of the diphenyl-naphthyl methane dyes.

TABLE 1

| DYE: | Color Index No. |
|---|---|
| Victoria Blue 4R | 42563 |
| Victoria Blue R (Basic Blue) | 44040 |
| Night Blue | 44085 |
| Victoria Blue B | 44045 |
| Victoria Blue | 42595 |
| New Green (MLB) | 44000 |
| New Patent Blue 4B | 44005 |
| Chrome Blue R | 44010 |
| Mordant Violet 18 | 44015 |
| New Patent Blue B | 44020 |
| Acid Green 16 | 44025 |
| New Patent Blue GA | 44030 |
| Acid Blue 108 | 44035 |
| Acid Violet 24 | 44055 |
| Acid Blue 88 | 44060 |
| Ceres Blue I | 44065 |
| Acid Blue 86 | 44075 |
| Cyanol Silk Blue | 44080 |
| Acid Green 50 | 44090 |
| Acid Blue 97 | 44095 |
| Mordant Blue 42 | 44100 |
| Mordant Green 31 | 44530 |
| Mordant Blue 28 | 44535 |

Various organic solvents can be utilized for the leucocyanides of the naphthyl methane dyes. Low boiling or volatile alcohols, ketones, ethers, esters, and hydrocarbons are available. Typical examples or organic solvents are methyl alcohol, ethyl alcohol, isopropyl alcohol, acetone, dioxane, methylethyl ketone, ethyl ether, isopropyl ether, ethyl acetate, nitromethane, nitroethane, benzene, toluene, dimethylformamide and tetrahydrofurane.

As previously pointed out, the activators which are used pursuant to my present invention must together comprise non-oxidizing strong inorganic acids and materials containing an alcoholic or phenolic hydroxyl group or groups. (As used in the claims, alcoholic hydroxyl will be understood to encompass phenolic hydroxyl.) The activator system may, therefore, comprise a mixture of two different compounds, one a non-oxidizing strong inorganic acid, and the other a material containing an alcoholic hydroxyl group (or groups); or, in certain cases, single compounds may be used, as hereafter pointed out, which are non-oxidizing and strongly acidic and which contain in their molecules one or more alcoholic hydroxyl groups. Tables 2 and 3 below list illustrative examples respectively of non-oxidizing strong inorganic acids and materials containing an alcoholic hydroxyl group (or groups) which, when employed conjointly, are useful as activators for the purposes of my present invention. Oxidizing acids such as nitric acid cannot be used for the purposes of my present invention.

TABLE 2

Phosphoric acids, particularly orthophosphoric acid
Hydrochloric acid
Hydrobromic acid
Hydroiodic acid
Sulfuric acid

TABLE 3

Octylphenol
Nonylphenol
Dodecylphenol
Ethylene glycol mono-phenyl ether
Ethylene glycol mono-methyl ether
Ethylene glycol mono-ethyl ether
Ethylene glycol mono-n-butyl ether
Diethylene glycol mono-methyl ether
Diethylene glycol mono-ethyl ether
Diethylene glycol mono-n-butyl ether
Propylene glycol mono-methyl ether
Dipropylene glycol mono-methyl ether
Tripropylene glycol mono-methyl ether
Polyethyleneglycols $H-(O-CH_2-CH_2)_n-OH$
  when $n$ is 2 to 20 or more
Methyl isobutyl carbinol
Glycerol
2,6-di-tertiary butyl-4-methyl phenol
2-methyl-1-pentanol
4-methyl-2-pentanol
2-ethyl butanol
1-hexanol
2-ethyl hexanol
2,6-dimethyl-4-heptanol
Tetrahydropyran-2-methanol
2,6,8-trimethyl-4-nonanol
1-butoxy ethoxy-2-propanol
n-Hexylcellosolve
Ethylene glycol
Triethylene glycol
Hexylene glycol
Propylene glycol
Dipropylene glycol
2,2-diethyl-1,3-propanediol
2-ethyl-2-butyl-1,3-propanediol
1,5-pentanediol
2-ethyl-1,3-hexanediol
N,N,N'N'-tetrakis(2-hydroxypropyl)ethylenediamine
1,2,6-hexanetriol
O-allyl phenol
Tertiary butyl phenol The aforesaid materials containing an alcoholic hydroxyl group or groups, illustrated by those listed in the foregoing Table 3, are organic compounds, they are compatible with the leucocyanides of the naphthylmethane dyes, and, as will be seen, they are not convertible to strong inorganic acids under the influence of ultraviolet light. For convenience and simplicity of expression, they are defined in the claims as being "(a) a compatible organic compound having an alcoholic hydroxyl group."

Among those compounds which, per se, can be used as activators pursuant to my present invention in that they are strongly acidic and non-oxidizing and also contain one or more alcoholic hydroxyl groups in their molecules are notably diphenolic acid (a monocarboxylic acid made by reacting 2 mols of phenol with 1 mol of levulinic acid, said resulting diphenolic acid containing 1 free carboxyl group and 2 phenolic groups); Polyether Acid E-3 (made by reacting diphenolic acid with epichlorhydrin to form a compound containing a plurality of carboxyl groups, a plurality of phenol groups, and a plurality of ether groups; Polyether Acid N-1 (made by reacting diphenolic acid and dichlorethyl ether, the resulting reaction product containing 4 carboxyl groups, 2 phenol groups, and 4 ether linkages); Polyether Acid B-4 (made by reacting diphenolic acid with dichlorobutane, said reaction product containing a plurality of carboxyl groups, a plurality of phenol groups, and a plurality of ether linkages); and the methyl ester of diphenolic acid.

I have also found that compounds may be used as the acid constituent of the activators for the purpose of my present invention which are of such character that, when subjected to ultraviolet light or electromagnetic radiation lower than 4000 angstrom units, they are converted into compounds of non-oxidizing strongly acid character and which are, of course, more acidic than the original compounds. Typical of such compounds are hydroxyl ammonium hydrochloride, and various chloridates such as, by way of illustration, the following:

(a) Phenylphosphorodichloridate, 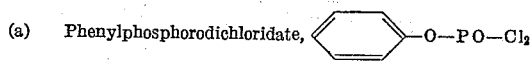

(b) Chloromethylphosphorodichloridate,
Cl—CH₂—OPO—Cl₂
(c) Dibutylphosphorochloridate, (C₄H₉O)₂=PO—Cl
(d) Dioctylphosphorochloridate, (C₈H₁₇O)₂=PO—Cl The proportions of the ingredients are variable within reasonable limits.

The leucocyanides of the naphthyl methane dyes will generally be utilized in proportions of the order of 0.5% to 3%, preferably from about 1% to 1.5%, by weight of the solution in which they are incorporated and which is utilized for effecting coating of the paper or equivalent surface.

The activators or activator systems will generally be utilized in proportions of the order of 8 to 25%, preferably about 10 to 15%, by weight of the solution in which the same are incorporated. Where a non-oxidizing strong inorganic acid (or a compound convertible thereto under exposure to ultraviolet light) and a material containing one or more alcoholic hydroxyl groups are together used as the activator system, the latter material will ordinarily be used in amounts by weight in excess of that of the non-oxidizing strong inorganic acid, usually in a ratio of from 2 to 4 of the material containing one or more hydroxyl groups to 1 of the non-oxidizing strong inorganic acid.

The following examples are illustrative of compositions falling within the scope of the invention. They are, of course, not to be construed as in any way limitative of the invention since numerous changes may be made, with respect to selection of leucocyanides, activators, coatings, ranges of proportions, and the like, without departing from the novel principles and teachings presented herein. All parts listed are by weight percent.

Example 1

| | |
|---|---|
| Leucocyanide of Victoria Blue R | 0.4 |
| Ethylene glycol mono-phenyl ether | 21.2 |
| Hydroxyl ammonium chloride | 4.2 |
| 20% solution of half-second cellulose acetate butyrate in 50–50 mixture of toluene and ethyl acetate | 21.2 |
| Dioxane | 53.0 | pH=3.7.

Example 2

| | |
|---|---|
| Leucocyanide of Victoria Blue R | 0.4 |
| Ethylene glycol mono-phenyl ether | 21.2 |
| Diphenolic acid | 4.2 |
| 20% solution of polyvinyl butyral in 50–50 mixture of toluene and ethyl acetate | 21.2 |
| Dioxane | 53.0 | pH=3.8.

Example 3

| | |
|---|---|
| Leucocyanide of Victoria Blue R | 0.4 |
| Ethylene glycol mono-phenyl ether | 17.0 |
| Polyether acid E–3 | 8.5 |
| Titanium ester of N,N,N¹,N¹-tetrakis (2-hydroxypropyl)ethylenediamine | 2.1 |
| Trimethoxy boroxine | 2.1 |
| 20% solution of half-second cellulose acetate butyrate in 50-50 mixture of toluene and ethyl acetate | 21.2 |
| 50/50 ethyl acetate/toluene | 48.7 | pH=4.1.

Example 4

| | |
|---|---|
| Leucocyanide of Victoria Blue 4R | 0.4 |
| Ethylene glycol mono-phenyl ether | 21.2 |
| Hydroxyl ammonium chloride | 4.3 |
| 20% solution of half-second cellulose acetate butyrate in 50-50 mixture of toluene and ethyl acetate | 21.2 |
| 50/50 ethyl acetate/toluene | 48.7 | pH=3.5.

Example 5

| | |
|---|---|
| Leucocyanide of Victoria Blue R | 0.4 |
| Ethylene glycol mono-methyl ether | 33.9 |
| Hydroxy ammonium chloride | 4.2 |
| 20% solution of half-second cellulose acetate butyrate in 50-50 mixture of toluene and ethyl acetate | 21.2 |
| Dioxane | 40.3 |

Example 6

| | |
|---|---|
| Leucocyanide of Victoria Blue R | 0.4 |
| Methyl Cellosolve | 33.9 |
| Dibutyl chloridate | 8.5 |
| 20% solution of half-second cellulose acetate butyrate in 50-50 mixture of toluene and ethyl acetate | 21.2 |
| Dioxane | 36.0 |

Example 7

| | |
|---|---|
| Leucocyanide of Victoria Blue 4R 1 | 0.4 |
| Sulfuric acid (conc.) | 0.4 |
| Ethylene glycol mono-phenyl ether | 12.8 |
| 20% solution of half-second cellulose acetate butyrate in 50-50 mixture of toluene and ethyl acetate | 25.4 |
| Dioxane | 61.0 | pH=2.2.

Each of the foregoing compositions is advantageously coated on paper in the following manner: A thin base coat of cellulose acetate butyrate is first applied to the paper and then dried. Then a first thin coat of the dye solution is deposited on the base coating and dried, after which a second thin coat of the dye solution is deposited and dried. Finally, a thin top coating of cellulose acetate butyrate is applied and dried. The resulting coated papers are then exposed to ultraviolet light through a stencil or a cellulose acetate butyrate, cellulose acetate or other transparency. In typical tests, exposure was for a period of 5 seconds using a Hanovia utility lamp as a source of ultraviolet rays. After exposure, the papers were allowed to remain continuously for 168 hours in fluorescent lamp ambient conditions.

The resulting colored papers show good reproductions which are stable over long periods of time to conditions of darkness as well as ambient light. Thus, for instance, papers made using the compositions of Examples 1 and 2 showed a slight background darkening 24 hours after exposure but this background did not build up after 168 hours. The background was materially lighter than that experienced using typical triphenylmethane leucocyanides. Again, by way of illustration, papers coated with the compositions of Examples 3 and 4 showed very little background build-up after 168 hours in ambient conditions.

In general, the pH of the leucocyanide dye solutions will, for best results, fall into the range of 2 to 5 and especially within the range of 3 or 3.5 to 4.

It is particularly desirable that the coating solutions be colorless or substantially so. It may be pointed out that solutions such as are shown in the foregoing Examples 1 to 7, although having a low pH, are colorless or essentially colorless when prepared and remain colorless over at least very long periods of time. In sharp contrast thereto, under similar conditions of acidity, the triphenylmethane dye leucocyanides produce dark colored solutions which, however, upon standing, usually from 2 to 3 weeks, decolorize.

Transparent cellulose acetate butyrates represent especially desirable organic film-forming barrier coatings, or coatings in solution in which the leucocyanides and activators are incorporated, or top coatings. Other transparent organic film-forming materials can be utilized such as polyvinyl alcohols, cellulose acetates, polyvinyl butyrals, and the like.

The leucocyanides of the naphthyl methane dyes, in the presence of the activators, are, as stated above, sensitive when subjected to ultraviolet light and various of them are also sensitive to other electromagnetic radiation shorter than 4000 angstrom units. Moreover, within the ultraviolet range or the aforesaid range of electromagnetic radiation, the various leucocyanides vary in the sensitivity with different wave lengths. In general, the range of wave lengths in which sensitivity mainly occurs is approximately 2000 to 4000 angstrom units, with strongest sensitivity usually lying in the range of 2300 to 2600 angstrom units. Various suitable sources of the aforesaid rays or radiation are available in the art including, by way of example, quartz mercury lamps, ultraviolet cored carbon arcs, and high-flash lamps.

Transparencies of various types can be employed as, for instance, those of cellulose acetate and cellulose acetate butyrate, advantageously of a thickness not appreciably exceeding 0.0025 inch. When ultraviolet rays are passed through an ordinary film negative, the time required to cause formation of the dye from its leucocyanide is much longer than when no transparency is used. Hence, in order to obtain rapid activation of the leucocyanide, the use of transparencies of the character indicated above is especially advantageous.

While, at least for most purposes, papers will constitute the surfaces on which the photosensitive coatings are deposited, it will be understood that, in the broader aspects of the invention, various other materials can be used such as metals, glass, textile fabrics, and sheet stock or films of synthetic plastics such as cellulose acetate, cellophane, cellulose acetate butyrate, etc.

The photosensitive compositions of the present invention may have incorporated therein various supplemental agents such as have heretofore been utilized in known photosensitive compositions so long as they do not adversely affect the desired properties and characteristics of said compositions.

The invention is of value in the arts of color and multicolor printing, photography and photoduplication, microfilm enlargement, and actinometry.

Where reference is made in the claims to leucocyanides of naphthyl methane dyes, it will be understood to encompass leucocyanides of diphenyl-naphthyl methane dyes, monophenyl-dinaphthyl methane dyes, and trinaphthyl methane dyes. The phenyl and naphthyl radicals may contain various substituents such as halogen, lower alkyl, lower alkoxy, and sulfonic acid radicals.

What I claim as new and desire to protect by Letters Patent of the United States is:

1. A photosensitive composition, sensitive to ultraviolet light, comprising a leucocyanide of a naphthyl methane dye selected from the group consisting of diphenyl-mononaphthyl methane dyes, monophenyl-dinaphthyl methane dyes and trinaphthyl methane dyes, and, as an activator therefor, a strongly acid non-oxidizing compound having at least one carboxylic acid group and at least one alcoholic hydroxyl group.

2. A photosensitive composition, sensitive to ultraviolet light, comprising a leucocyanide of a diphenyl-mononaphthyl methane dye, and, as an activator therefor, a strongly acid non-oxidizing compound having at least one carboxylic acid group and at least one alcoholic hydroxyl group.

3. A photosensitive composition, sensitive to ultraviolet light, comprising an organic solvent solution containing a transparent organic solvent solution containing a transparent organic film-forming material, a leucocyanide of a diphenyl-mononaphthyl methane dye, and, as an activator, therefor a strongly acid non-oxidizing compound having at least one carboxylic acid group and at least one alcoholic hydroxyl group, said composition having a pH in the range of 3 to 4.

4. A photosensitive composition, sensitive to ultraviolet light, comprising a leucocyanide of a naphthyl methane dye selected from the group consisting of diphenyl-mononaphthyl methane dyes, monophenyl-dinaphthyl methane dyes and trinaphthyl methane dyes, and, as an activator therefor, (a) a compatible organic compound having an alcoholic hydroxyl group and (b) a chemical compound different from (a) and which, under the action of ultraviolet light, is convertible to a strong non-oxidizing inorganic acid which is more acidic than said original chemical compound.

5. A photosensitive composition, sensitive to ultraviolet light, comprising a leucocyanide of a diphenyl-mononaphthyl methane dye, and, as an activator therefor, (a) a compatible organic compound having an alcoholic hydroxyl group and (b) a chemical compound different from (a) and which, under the action of ultraviolet light, is convertible to a strong non-oxidizing inorganic acid which is more acidic than said original chemical compound.

6. A photosensitive composition, sensitive to ultraviolet light, comprising an organic solvent solution containing a transparent organic film-forming material, a leucocyanide of a diphenyl-mononaphthyl methane dye, and as an activator therefor, (a) a compatible organic compound having an alcoholic hydroxyl group and (b) a chemical compound different from (a) and which, under the action of ultraviolet light, is convertible to a strong non-oxidizing inorganic acid which is more acidic than said original chemical compound.

7. A photosensitive composition, sensitive to ultraviolet light, comprising a leucocyanide of a diphenyl-mononaphthyl methane dye, and, as an activator therefor, (a) ethylene glycol mono-phenyl ether and (b) hydroxyl ammonium chloride.

8. A photosensitive composition, sensitive to ultraviolet light, comprising a leucocyanide of a diphenyl-mononaphthyl methane dye, and, as an activator therefor, (a) ethylene glycol mono-methyl ether and (b) hydroxyl ammonium chloride.

9. A photosensitive composition, sensitive to ultraviolet light, comprising a leucocyanide of a diphenyl-mononaphthyl methane dye, and, as an activator therefor, a strongly acidic non-oxidizing phenol reaction product containing at least one free carboxyl group and at least one phenolic group.

10. Photosensitive sheet material comprising sheet stock carrying a leucocyanide of a naphthyl methane dye selected from the group consisting of diphenyl-mononaphthyl methane dyes, monophenyl-dinaphthyl methane dyes and trinaphthyl methane dyes, and, as an activator therefor, a strongly acid non-oxidizing compound having at least one carboxylic group and at least one alcoholic hydroxyl group.

11. Photosensitive sheet material comprising sheet stock carrying a leucocyanide of a diphenyl-mononaphthyl metahne dye, and, as an activator therefor, a strongly acid non-oxidizing compound having at least one carboxyl group and at least one alcoholic hydroxyl group.

12. Photosensitive sheet material comprising sheet stock carrying a leucocyanide of a naphthyl methane dye selected from the group consisting of diphenyl-mononaphthyl methane dyes, monophenyl-dinaphthyl methane dyes and trinaphthyl methane dyes, and, as an activator therefor, (a) a compatible organic compound having an alcoholic hydroxyl group and (b) a chemical compound different from (a) and which, under the action of ultraviolet light, is converted to a strong non-oxidizing inorganic acid which is more acidic than said original chemical compound.

13. Photosensitive sheet material comprising sheet stock carrying a leucocyanide of a diphenyl-mononaphthyl methane dye, and, as an activator therefor, (a) a compatible organic compound having an alcoholic hydroxyl group and (b) a chemical compound different from (a) and which, under the action of ultraviolet light, is converted to a strong non-oxidizing inorganic acid which is more acidic than said original chemical compound.

14. Photosensitive sheet material comprising paper sheet stock carrying a transparent organic film-forming coating containing a leucocyanide of a diphenyl-mononaphthyl methane dye, and, as an activator therefor, a strongly acid non-oxidizing compound having at least one carboxylic acid group and at least one alcoholic hydroxyl group.

15. Photosensitive sheet material comprising paper sheet stock carrying a transparent organic film-forming coating containing a leucocyanide of a diphenyl-mononaphthyl methane dye, and, as an activator therefor, (a) a compatible organic compound having an alcoholic hydroxyl group and (b) a chemical compound different from (a) and which, under the action of ultraviolet light, is converted to a strong non-oxidizing inorganic acid which is more acidic than said original chemical compound.

16. Photosensitive sheet material comprising sheet stock carrying a leucocyanide of a diphenyl-mononaphthyl methane dye, and, as an activator therefor, a strongly acidic non-oxidizing phenol reaction product containing at least one free carboxyl group and at least one phenolic group.

References Cited by the Examiner

UNITED STATES PATENTS

| | | | |
|---|---|---|---|
| 2,676,887 | 4/54 | Chalkley | 96—90 |
| 2,829,052 | 4/58 | Chalkley | 96—90 |
| 2,855,303 | 10/58 | Chalkley | 96—90 |
| 2,877,166 | 3/59 | Chalkley | 96—90 X |
| 2,895,892 | 7/59 | Chalkley | 96—90 X |
| 2,951,855 | 9/60 | Chalkley | 96—90 X |

OTHER REFERENCES

Journal, American Chemical Society, vol. 10, 1935, No. 7, pp. 1151–54.

Conant et al., The Chemistry of Organic Compounds, The Macmillan Co., New York 4th Edition, 1954, pp. 362–363, 346–348 and 359–360.

NORMAN G. TORCHIN, *Primary Examiner.*

HAROLD N. BURSTEIN, PHILIP E. MANGAN, ABRAHAM H. WINKELSTEIN, A. LOUIS MONACELL, *Examiners.*